(12) United States Patent
Lindenblatt

(10) Patent No.: US 7,040,207 B2
(45) Date of Patent: May 9, 2006

(54) LOG MERCHANDISER

(75) Inventor: Bruno Lindenblatt, Prince George (CA)

(73) Assignee: Linden Fabricating & Engineering (Prince George) Ltd., Prince George (CA)

( * ) Notice: Subject to any disclaimer, the term of this patent is extended or adjusted under 35 U.S.C. 154(b) by 90 days.

(21) Appl. No.: 10/264,735

(22) Filed: Oct. 4, 2002

(65) Prior Publication Data

US 2004/0016334 A1 Jan. 29, 2004

(30) Foreign Application Priority Data

Jul. 23, 2002 (CA) .................................. 2394560

(51) Int. Cl.
*B27B 7/00* (2006.01)
*B26D 5/38* (2006.01)

(52) U.S. Cl. ..................... 83/508.1; 83/508.3; 83/76.8; 144/379

(58) Field of Classification Search ............... 83/508.1, 83/23, 76.8, 113, 115, 365, 368, 76.7, 65.5, 83/74, 508.2, 508.3, 155, 156, 456, 76.5; 144/312, 386, 379, 250.25, 245.5, 242.1, 144/75.5, 425.3, 370

See application file for complete search history.

(56) References Cited

U.S. PATENT DOCUMENTS

| | | | | |
|---|---|---|---|---|
| 1,802,514 A | * | 4/1931 | Johnson ..................... 83/425.4 |
| 2,641,288 A | * | 6/1953 | Blickenderfer et al. ....... 83/368 |
| 3,036,605 A | * | 5/1962 | Joa ............................. 83/354 |
| 3,538,963 A | | 11/1970 | Adams | |
| 3,908,495 A | | 9/1975 | Bush, Jr. et al. | |
| 4,031,790 A | * | 6/1977 | Arvidsson .................. 83/425.4 |
| 4,147,259 A | * | 4/1979 | Nilsson ...................... 414/746.8 |
| 4,184,395 A | * | 1/1980 | Blachly et al. ............ 83/486.1 |
| 4,259,886 A | * | 4/1981 | Seid et al. .................. 83/425.2 |
| 4,287,798 A | * | 9/1981 | Cooper et al. ................. 83/155 |
| 4,330,019 A | | 5/1982 | Murphy et al. | |
| 4,468,992 A | * | 9/1984 | McGeehee ..................... 83/56 |
| 4,468,993 A | * | 9/1984 | McCown et al. ............. 83/112 |
| 4,960,023 A | * | 10/1990 | Reuter et al. ................. 83/368 |
| 5,054,355 A | * | 10/1991 | Tisse et al. .................... 83/879 |
| 5,142,955 A | * | 9/1992 | Hale ........................... 83/75.5 |
| 5,174,351 A | * | 12/1992 | Lindenblatt et al. ......... 144/356 |
| RE35,086 E | * | 11/1995 | Paulson et al. ................ 83/13 |
| 5,638,878 A | * | 6/1997 | Weirathmueller ........ 144/208.6 |
| 6,279,441 B1 | * | 8/2001 | Streblow .................... 83/75.5 |
| 6,305,259 B1 | | 10/2001 | Whitworth et al. | |
| 6,543,498 B1 | * | 4/2003 | Woodham .................... 144/379 |
| 6,631,662 B1 | * | 10/2003 | Akram et al. ................. 83/495 |
| 6,705,190 B1 | * | 3/2004 | Newnes et al. .............. 83/75.5 |
| 2002/0038588 A1 | * | 4/2002 | Newnes et al. .............. 83/75.5 |
| 2002/0122664 A1 | * | 9/2002 | Mjelstad et al. ............. 392/478 |

* cited by examiner

*Primary Examiner*—Allan N. Shoap
*Assistant Examiner*—Ghassem Alie
(74) *Attorney, Agent, or Firm*—Michael A. Glenn; Glenn Patent Group

(57) ABSTRACT

A log merchandising apparatus includes feeding and staging feeders and a plurality of pivoting overhead truss-mounted saws. The saws are travelling saws, reversibly and independently movable along the longitudinal axis of the log by means of a rack and pinion drive and lineal bearings.

4 Claims, 9 Drawing Sheets

LOG MERCHANDISER

TECHNICAL FIELD OF THE INVENTION

This invention relates to a log merchandising apparatus.

BACKGROUND OF THE INVENTION

Log merchandisers process tree-length logs into shorter lengths for further processing. It is desirable to process the logs as quickly as possible, with as little wasted wood as possible.

One prior art log merchandiser is disclosed in U.S. Pat. No. 6,305,259, issued to Whitworth. Whitworth discloses a log processing system whereby logs are transported via a series of conveyor belts, through a singulator and scanner, and into a cradle assembly that holds the logs while pivoting adjustable saws cut them. The saws and the log cradles are both mounted on saw boxes. The entire saw box moves laterally on wheel assemblies on floor-mounted guide rails. Each saw box, along with its associated saw and log cradle, is positioned along the length of the log prior to placing the log in the log cradle.

Hydraulic cylinders move the saw boxes to their proper positions, as determined by digital probes. Accordingly, the length of the hydraulic cylinders determines the travel distance of the saw assemblies. No saw can travel farther than the length of the piston rod in the hydraulic cylinder. Even if a long hydraulic cylinder is used, no adjacent saws may move closer together than the distance determined by the substantial width of the saw box. This limits the length of log segments that can be cut. It also limits the length of logs that may be processed by the apparatus.

Other examples of travelling saws are disclosed in the prior art. U.S. Pat. No. 5,179,883 to Payr discloses a saw carriage supported on guide rails on a floor-mounted frame. A motor-driven rope pulley, supported by guide rollers attached to the frame, drives the saw carriage laterally. Another travelling saw is described in U.S. Pat. No. 4,330,019 to Murphy. In this system, each saw rests on a floor-mounted carriage fitted with wheels that ride on rails. A pinion, rotated by a motor mounted on the saw carriage, extends out of the bottom of each saw carriage. The pinion meshes with a rack secured to one rail to move the saw carriage along the length of the apparatus. A similar travelling saw system is disclosed in U.S. Pat. No. 6,279,441 to Streblow.

In the case of each of the prior art systems described above, the saws are mounted on relatively bulky apparatus mounted on the floor adjacent the log delivery system. This makes it difficult or dangerous for personnel to move about the merchandiser, for example to clean or maintain it. In addition, the rail mounted saw assemblies that characterize the prior art require powerful drives to move the significant weight of the assemblies. This limits the accuracy and speed at which merchandising can take place.

There is therefore an advantage to moving the travelling saw assemblies in a log processing system off the floor, to a point above the log delivery system. One example of an overhead saw assembly is U.S. Pat. No. 5,142,955 to Hale, which discloses a travelling trim saw carried on an aluminum and low-friction plastic carriage slidably supported on an overhead box beam. Hale's carriage travels laterally approximately two feet under the control of a servomotor, which connects to a toothed pulley engaged with an endless belt supported by another toothed pulley. Another overhead saw system is described in U.S. Pat. No. 4,262,572 to Flodin, wherein the saw carriage, containing one main saw and two horizontal saws, is supported on guide wheels that run along an overhead track. U.S. Pat. No. 4,960,023 to Reuter discloses a third overhead saw system, wherein two sliding saw carriages, each containing a plurality of saws, are suspended on an overhead guide support. Upper and lower guide rolls, or other sliding guide elements, are used to support the saw carriages as they move along the guide support. The saw carriages are positioned with hydraulic cylinders fastened to the guide support stand.

These overhead travelling saw systems move parts of the log processing apparatus off the floor. However, the systems do not allow for a plurality of independently movable saws. In addition, the beams supporting the saws often restrict how far the saws may move in the lateral direction. Therefore, the length of logs that can be processed and the length of the cut logs are limited. This limits the efficiency of the log processing system.

It is an object of the present invention to increase the speed and efficiency of a log merchandiser. It is a further object of the present invention to reduce the complexity, weight and floor space required for the saw assembly and to provide a saw assembly that is highly accurate and versatile.

These and other objects of the invention will be appreciated by reference to the summary of the invention and to the detailed description of the preferred embodiment that follow.

SUMMARY OF THE INVENTION

One aspect of the invention is the provision, in a log merchandising system, of truss-mounted overhead travelling saws that pivot downward to cut the log.

In a more specific aspect, the invention further comprises a rack and pinion drive assembly for displacing the saws laterally along the length of the log. The displacement drive motor may be mounted directly on the carriage, which also includes the saw motor.

In yet a further aspect, the invention comprises the use of a lineal bearing assembly for facilitating lateral displacement of the saws.

In yet another aspect, the invention comprises a log feeding apparatus to ensure that logs are fed individually, a log holding apparatus, and overhead truss-mounted travelling saws.

The saws are mounted on an overhead truss, positioned slightly forward of the cutting area, and pivot down toward the log in order to make their cuts. The overhead saw assembly moves machine components off the floor and above the log holding apparatus, reducing the amount of floor space required for the apparatus and making it easier for workers to move around the merchandiser when the saws are not in use.

The use of a rack and pinion drive assembly according to the invention allows the entire saw system to be much smaller than prior art merchandisers wherein each saw is mounted on an independent large box assembly.

In one aspect, the invention is a log merchandiser comprising a log positioning stage to establish placement and orientation of a log and support a log in a stationary position in a cradle assembly having a longitudinal axis; an elongated overhead truss extending above said cradle assembly parallel to said longitudinal axis; and a plurality of pivoting saw assemblies mounted for lateral travel along said overhead truss, said saw assemblies comprising a pivoting saw blade selectively extendible to said cradle assembly.

In a further aspect, the saw assemblies travel laterally along said truss on a rack and pinion drive.

In yet a further aspect, the log merchandiser comprises lineal bearing assemblies to support the saw assemblies on the overhead truss.

In a more specific aspect, each pivoting saw assembly comprises a circular saw pivotally mounted on a saw arbor; a motor to operate the saw; and a motor to actuate said pinion so as to move the saw assembly along the overhead truss.

In a further aspect, the invention comprises a gear system, connected to the motor that actuates the pinion, to allow lateral movement of said saw assembly and a lateral displacement control system to control the lateral movement of said saw assembly.

In yet a further aspect, the invention comprises a frame to support said travelling saw assembly components on said truss and a bearing assembly to support said frame on said truss. More specifically, the gear system is a rack and pinion gear system, comprising a vertically mounted reducer, a spur rack and a spur gear engaged with said spur rack. The support frame comprises two vertical L-shaped plates joined by a horizontal plate connected to the long sides of each of said L-shaped plates, and further comprises support shelves extending from the short sides of each of said L-shaped plates underneath said horizontal plate.

The bearing assembly connects said horizontal plate to said overhead truss and comprises at least one linear roller bearing and at least one linear bearing guideway which interlocks with each said linear roller bearing. In the preferred embodiment of the invention, the bearing assembly comprises four linear roller bearings, each mounted on a corner of the uppermost side of said horizontal plate. Further, the preferred embodiment comprises two linear bearing guideways, mounted on the lowermost side of the overhead truss, each linear bearing guideway interlocking with two of said linear roller bearings.

In a further aspect, the log merchandiser comprises at least one stationary circular saw mounted on the overhead truss.

In yet a further aspect, the invention may comprise a mechanism to align an end of the log with said reference line. Such mechanism may comprise a piston pushing one end of said log.

The foregoing was intended as a broad summary only and was not intended to define the limits or requirements of the invention. Other aspects of the invention will be appreciated by reference to the detailed description of the preferred embodiment and to the claims.

BRIEF DESCRIPTION OF THE DRAWINGS

The preferred embodiment of the invention will be described by reference to the drawings in which.

DETAILED DESCRIPTION OF THE PREFERRED EMBODIMENT OF THE INVENTION

Figure 1:
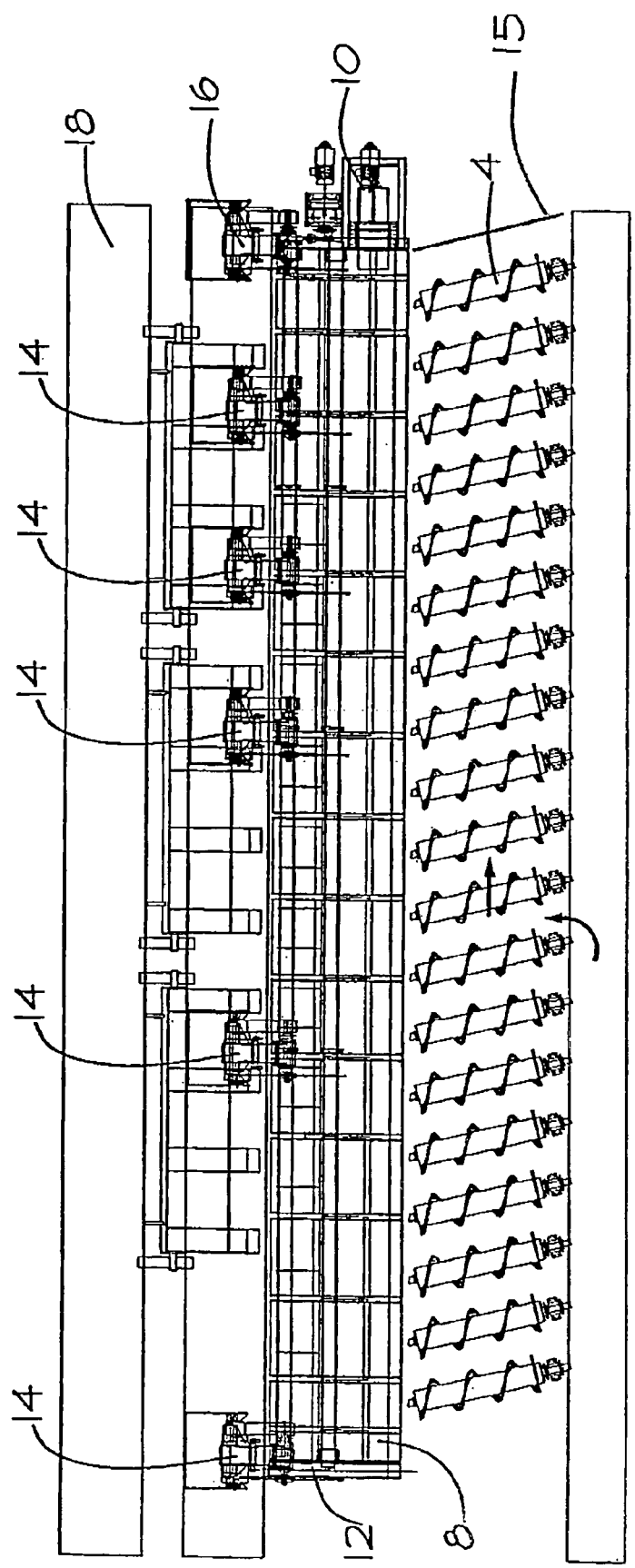
FIG. 1 is a front view of the preferred embodiment of the invention.

In the preferred embodiment of the log merchandiser of the invention, a log is selected out of a pile with a singulating device. The log is debarked and scanned to determine defects, diameter, sweep and length. The scan enables optimization software to determine the optimal cuts to maximize the value from the log. At the end of the scan cycle, the log is carried on conveyor belts to the infeed of the log merchandiser where it is pushed by an array of log pushers onto the bottom flight of a log feeding apparatus 4, as shown in FIG. 1.

Figure 2:
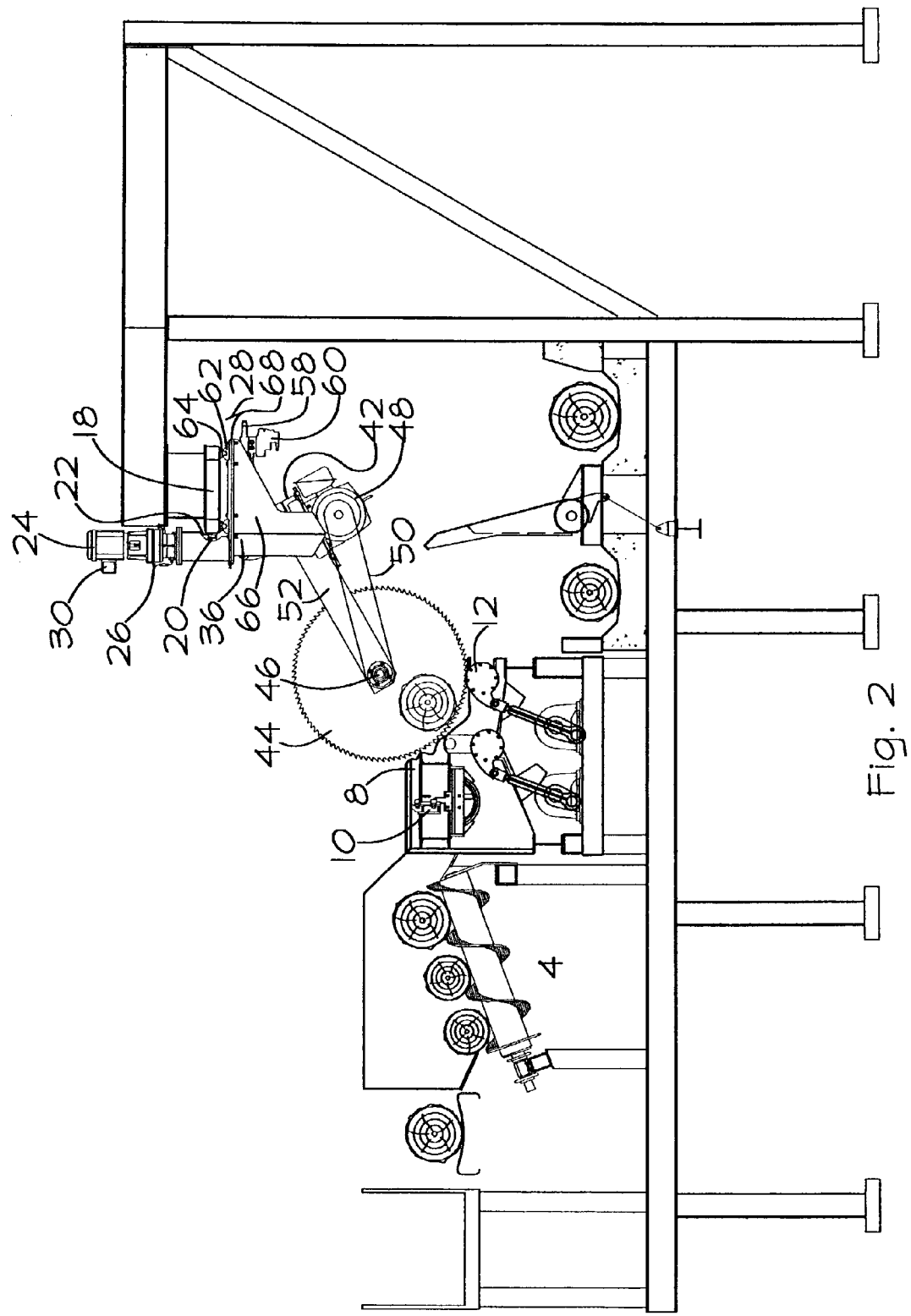
FIG. 2 is a side view of the preferred embodiment.

The log feeding apparatus 4 of the log merchandiser can take several forms. It may be a spiral log feeder of the type disclosed in applicant's co-pending U.S. patent application Ser. No. 09/997,379, which is the embodiment shown for reference in FIG. 2. Alternatively, the log may be fed by a quadrant log feeder of the type disclosed in U.S. Pat. No. 5,119,930, issued to Stelter, a stepped singulating and ending device, as disclosed in U.S. Pat. No. 5,257,688, issued to Fridlund or U.S. Pat. No. 5,174,351, issued to Lindenblatt et al, or an assembly comprising one or more endless conveyor belts containing protrusions which act to carry individual logs forward and up toward the saws. The invention also contemplates using some of these log feeding apparatus in series, one feeding into the next. In general, the main concern in feeding logs through the log merchandiser is to ensure the logs move through at a consistent maximum speed, being presented to the saws for cutting at an optimal rate without overwhelming the saws. Therefore any combination of log feeding apparatus 4 may be used. It is also possible to eliminate the log feeding apparatus completely, if the log holding apparatus of the next stage can properly carry out this feeding function.

Once a log reaches the top of the log feeding apparatus 4, it drops over the top edge and enters the first stage of the log holding apparatus 8. In the preferred embodiment shown in FIG. 2, the log holding apparatus is a two-stage log ladder of the type disclosed in U.S. Pat. No. 5,423,417, issued to Redekop, but any apparatus capable of advancing the log and properly presenting it to the saws for the cutting cycle may be used. The main requirements for selecting a log holding apparatus are that each log must be advanced individually and then held securely at the correct elevation for the saws to descend in the cutting cycle. Therefore, any apparatus with a secure log-holding cradle may be used to present the log to the saws for the cutting cycle. Apparatus that contain clamps to hold the log securely may also be used, but are not preferred, as the clamps may interfere with the cutting path of the saws.

It may also be preferable to be able to push the log laterally, such as with a piston, in order to line up the log for an end trim cut. In the preferred embodiment, one end of the log is lined up with a "O" reference line 15 as the log enters the first stage of the log holding apparatus 8. If the initial scan has determined that no cut is required to square up the log, a piston 10 extends laterally through the fence line to push the log laterally such that its end is away from the "O" reference line 15, a reference line defined by the cutting path of the stationary circular "O" saw 16. Piston 10 is preferably mounted to a portion of, and disposed parallel to the longitudinal axis of, the first stage of the log holding apparatus 8. The first stage of the log holding apparatus 8 then advances the log into the second stage of the log holding apparatus 12. If the log does need trimming, the piston 10 pushes the log such that the log is properly aligned relative to the "O" reference line 15 before the log passes on to the second stage of the log holding apparatus 12.

The piston 10 is one possible even-ending means, by which a first end of the log is aligned with the "O" reference line 15, giving travelling overhead circular saws 14 a uniform point to measure from, and allowing accurate measurement of the log segments being cut. The piston 10 also places the log for a squaring or even-ending cut, allowing the stationary circular "O" saw 16 to cut off any uneven portion of the first end of the log. In some cases, the first end of the log may be acceptably flat and therefore does not need to be even-ended, in which case the piston 10 may push the end of the log away from the cutting path of the stationary circular "O" saw 16, so the stationary circular "O" saw 16 does not cut the log at the first end. The simplest means to align a log is to push the one end of the log, moving the log along the longitudinal axis of the log holding apparatus 8, until the other end of the log is properly positioned with respect to the "O" reference line 15. Any means to apply the longitudinal force to the log may be used: piston 10 is merely one example.

The second stage of the log holding apparatus 12 presents the properly aligned log and securely holds it in place so that the overhead saws 14 can pivot downward to make their cuts through the log. If the end of the log is not square, it will be trimmed. The trim cut, if required, will always be made at the "O" reference line 15 by the stationary circular "O" saw 16 (shown best in FIG. 1). The stationary circular "O" saw 16 is mounted on the underside of an overhead truss 18, forward of the second stage of the log holding apparatus 12. The stationary circular "O" saw 16 pivots down onto the log (not shown in FIG. 1) to complete a trim cut at the "O" reference line 15 and then retracts up out of the way so the second stage of the log holding apparatus 12 can safely eject the log segments onto an outfeed conveyor belt. The end of the log severed by the stationary circular "O" saw 16 falls through a gap on the log cradle between the fence line and the "O" reference line 15.

Figure 3:
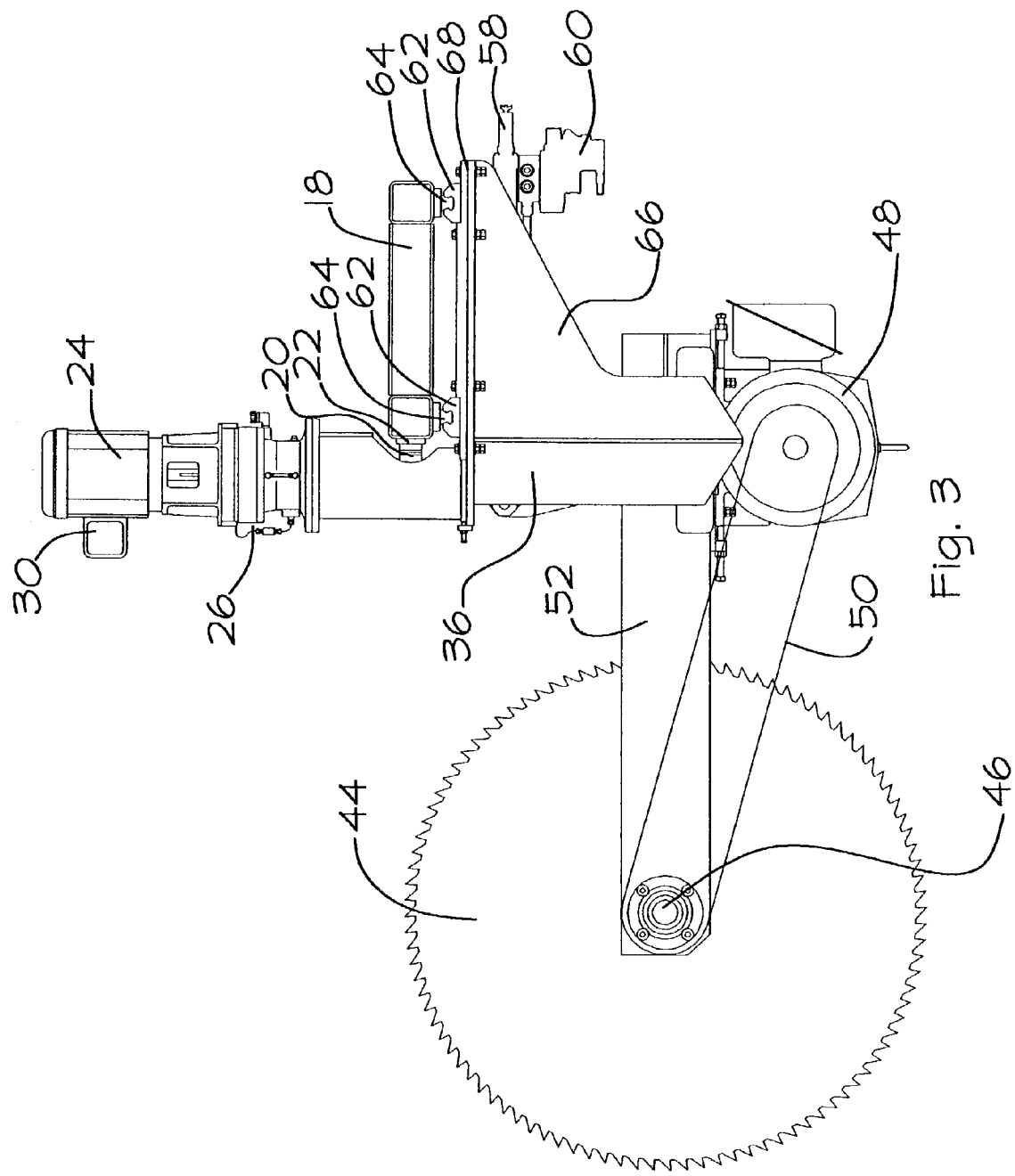
FIG. 3 is a side view of an overhead saw assembly according to the preferred embodiment.
Figure 4:
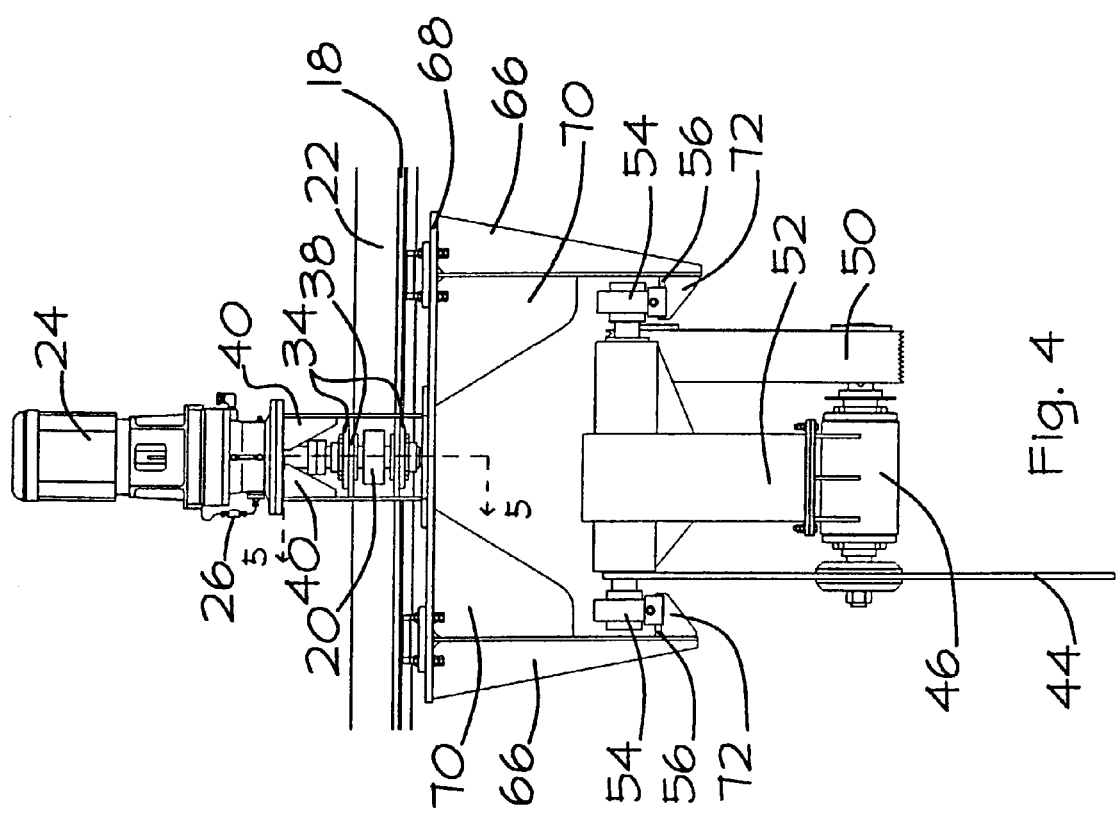
FIG. 4 is a front view of the overhead saw assembly shown in FIG. 3.

All other cuts are made with travelling overhead circular saws 14, shown in more detail in FIGS. 3 and 4, which pivot into and out of the cutting area in the same cutting cycle. The travelling saws 14 are also mounted on the overhead truss 18, on a linear guidance system. The preferred embodiment of the log merchandiser consists of four or five travelling saws 14 plus the stationary circular "O" saw 16. This embodiment is capable of processing logs up to 60 feet in length. Use of more travelling saws 14 and a longer overhead truss 18 would allow processing of longer logs.

Figure 5:
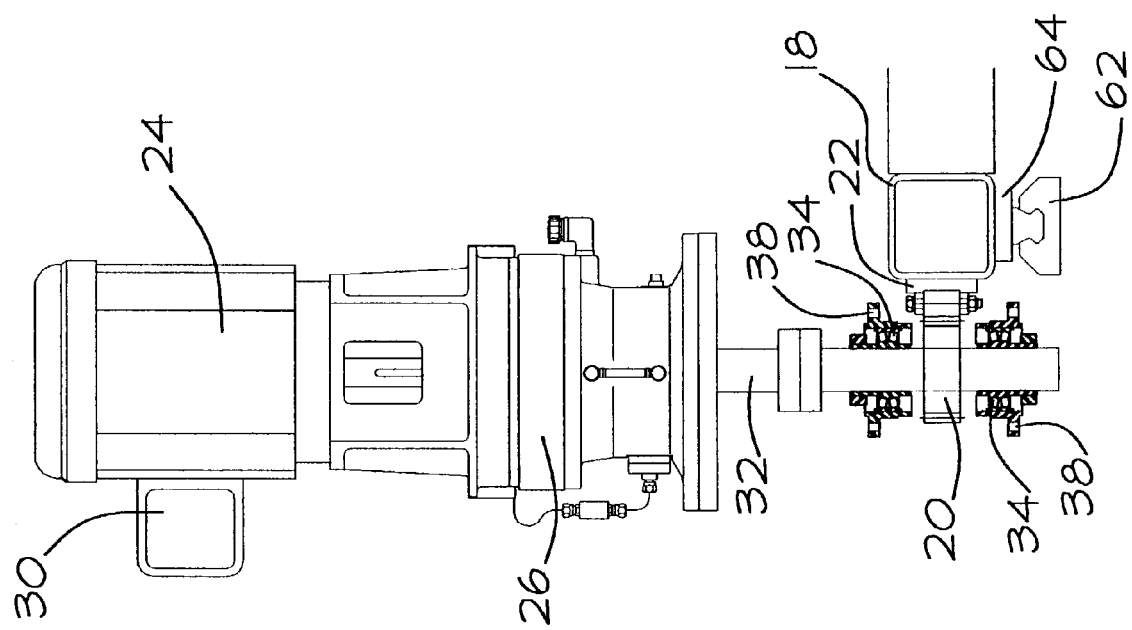
FIG. 5 is a side view of the vector motor assembly, with the spur rack and pinion drive assembly and overhead truss shown in section along line 5—5 of FIG. 4 according to a preferred embodiment.

The following description applies to the mounting and driving assembly for one of the overhead travelling saws 14. Each travelling saw 14 moves reversibly and independently along the length of the log on a rack and pinion drive comprising a spur gear 20 which engages a rack 22 mounted on the overhead truss 18. The drive assembly for the lateral movement of each saw, best shown in FIG. 5, is mounted on the top side of the overhead truss 18 and consists of a vector motor 24 directly connected to a vertically mounted reducer 26. A vector motor 24 is preferred for this application because it offers full feedback and control of the motor operation. The motor operating speed is directly linked to the movement of the saw carriage 28 along the overhead truss 18, in that the saw carriage 28 travels exactly 1.9 inches for each revolution of the motor. The vector motor 24 also offers electric braking for rapid stops. The vector motor 24 will ramp up from 0 to 48 inches per second (or down from 48 to 0, in the case of braking) in half a second. Computer control of the vector motor 24, through the control box 30, allows precise control of overhead saw 14 travel. Once the saw 14 is properly positioned for an optimal cut of the log, the vector motor 24 stops running and the saw carriage 28 movement immediately stops.

Referring again to FIGS. 3–5, a shaft 32 depending from the vertically mounted reducer 26 rotates a spur gear 20. The spur gear 20 engages a spur rack 22, mounted on the overhead truss 18, thus driving the travelling saw 14 laterally along the overhead truss 18. Piloted flange bearings 34 support the shaft 32. This type of bearing is preferred because it allows the proper alignment of the supporting plates 38 on the top and bottom of the shaft assembly. This in turn ensures the spur gear 20 and rack 22 are properly aligned and that the lineal travel frame 36 is mounted properly, reducing the chances that the saw carriage 28 will malfunction because of unbalanced wear on weight-bearing points. Diagonal braces 40 may be used to provide further support and stability for the shaft assembly.

Figure 6:
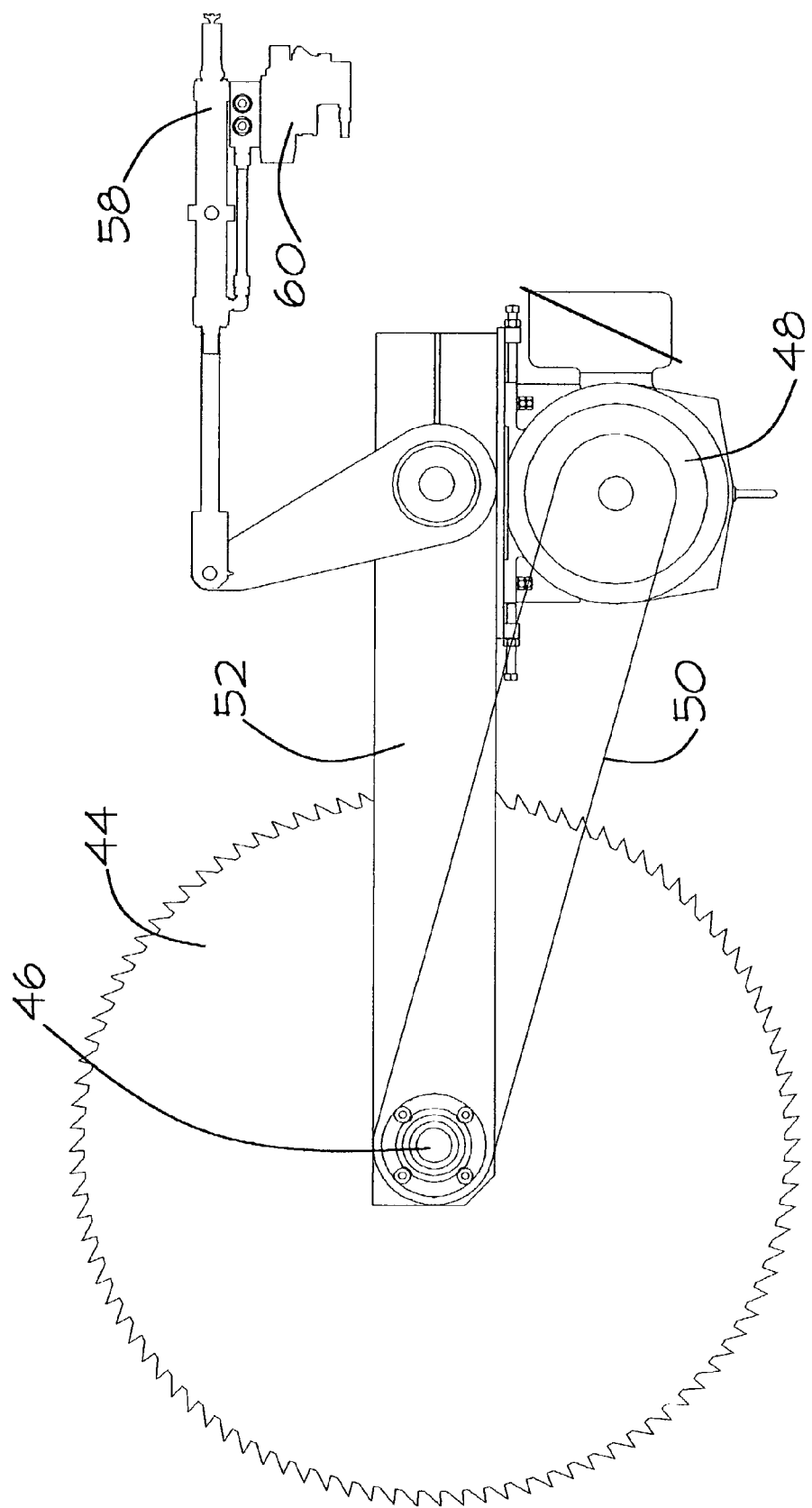
FIG. 6 is a side view of the saw blade and pivot platform without the lineal travel frame.

The lineal travel frame 36 supports the saw ladder 42, shown in FIG. 6. The saw ladder 42 consists of a circular saw 44, mounted on a saw arbor 46 and driven by motor 48, mounted rearward of the saw 44. The diameter of the saw 44 is determined by the size of the cradles in the final stage of the log holding apparatus 12, and by the typical range of log diameters that will be processed in the log merchandiser. The belt 50 between the motor 48 and the saw 44 drives the saw 44. The saw 44 is supported on a pivot arm 52 which allows the saw 44 to pivot in and out of contact with the log, aided by spherical roller bearings 54 supported on shelves 56 inside the lineal travel frame 36 (not shown in FIG. 6). In the preferred embodiment of the invention, the pivot arm 52 is a 12-inch square piece of tubing. A temposonic cylinder 58 mounted in the linear travel frame 36 controls the pivoting motion of the pivot arm 52. Control valves 60 extending below the temposonic cylinder 58 operate the cylinder 58 itself.

Figure 7:
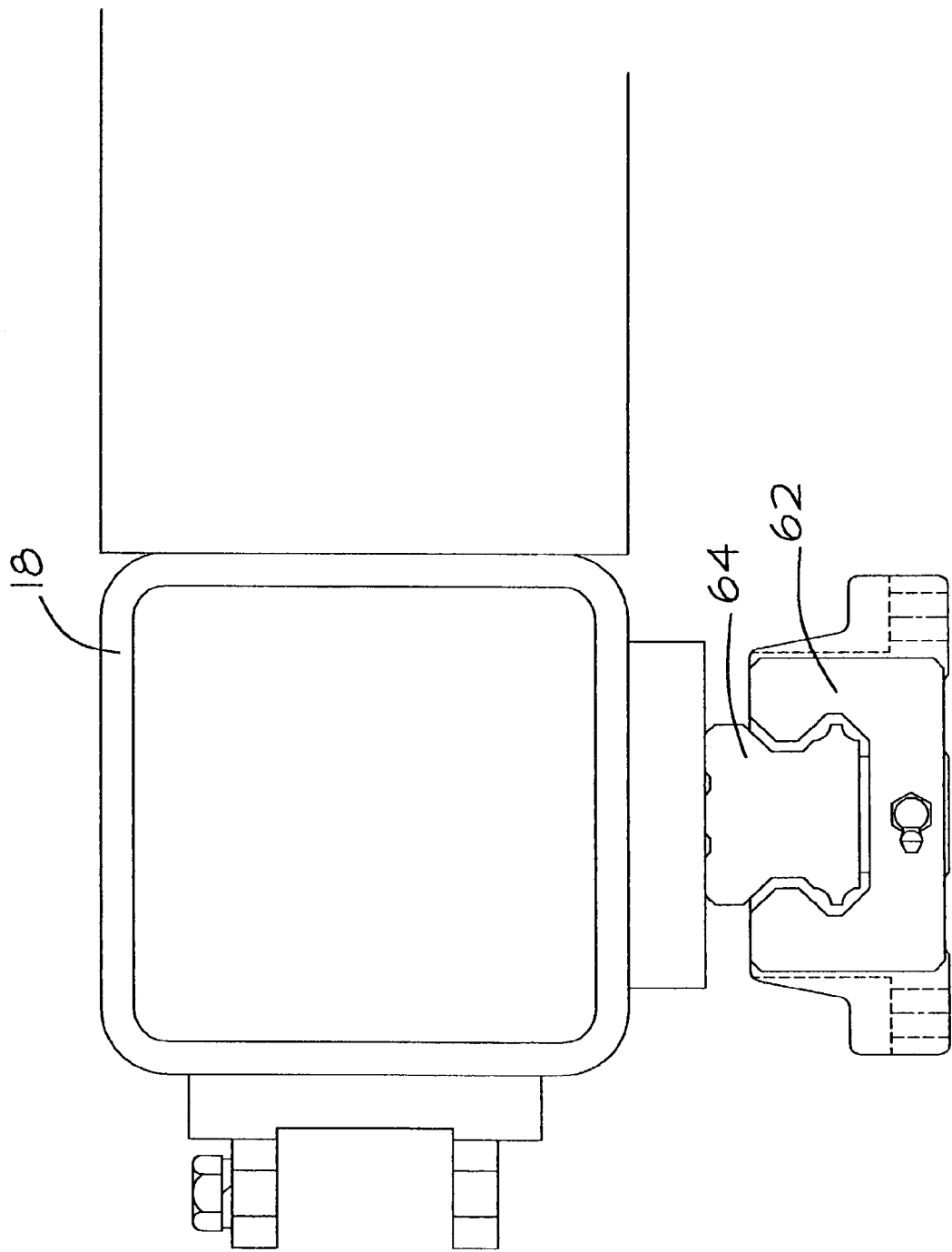
FIG. 7 is an enlarged view of one lineal bearing assembly that supports the lateral movement of the travelling saws.

The linear guidance system, which connects the lineal travel frame 36 and the underside of the overhead truss 18, is shown in FIG. 5 and in enlarged detail in FIG. 7. The lineal bearing guidance system comprises a series of linear recirculating roller bearings 62 interlocked with linear bearing guideways 64, best shown in FIG. 7, which run parallel to the longitudinal axis of the log. The guideways 64 depend from the overhead truss 18, while the complementary linear roller bearings 62 protrude from the upper side of the lineal travel frame 36. The interlock between the linear roller bearing 62 and depending bearing guideway 64 securely mounts the lineal travel frame 36 on the overhead truss 18. The lineal bearing guidance system allows smooth and secure lateral movement of the overhead travelling saw 14. In the preferred embodiment of the invention, there are four linear bearings 62 for each travelling saw 14, arranged in a square or rectangular shape on top of the lineal travel frame 36, which interlock with a pair of linear bearing guideways 64 mounted on the overhead truss 18.

The lineal bearing guidance system of the present invention allows each saw 14 to move as far as required, in order to make an optimal cut. Each saw 14 could travel very close to its neighbor if necessary, for example, to cut out a small segment of the log that has an unacceptable number of defects. Conversely, the saws 14 can travel all the way to the opposite end of the log if very few cuts are required. In the preferred embodiment, only four or five travelling saws 14 are generally required to process logs up to 60 feet long.

Figure 8:
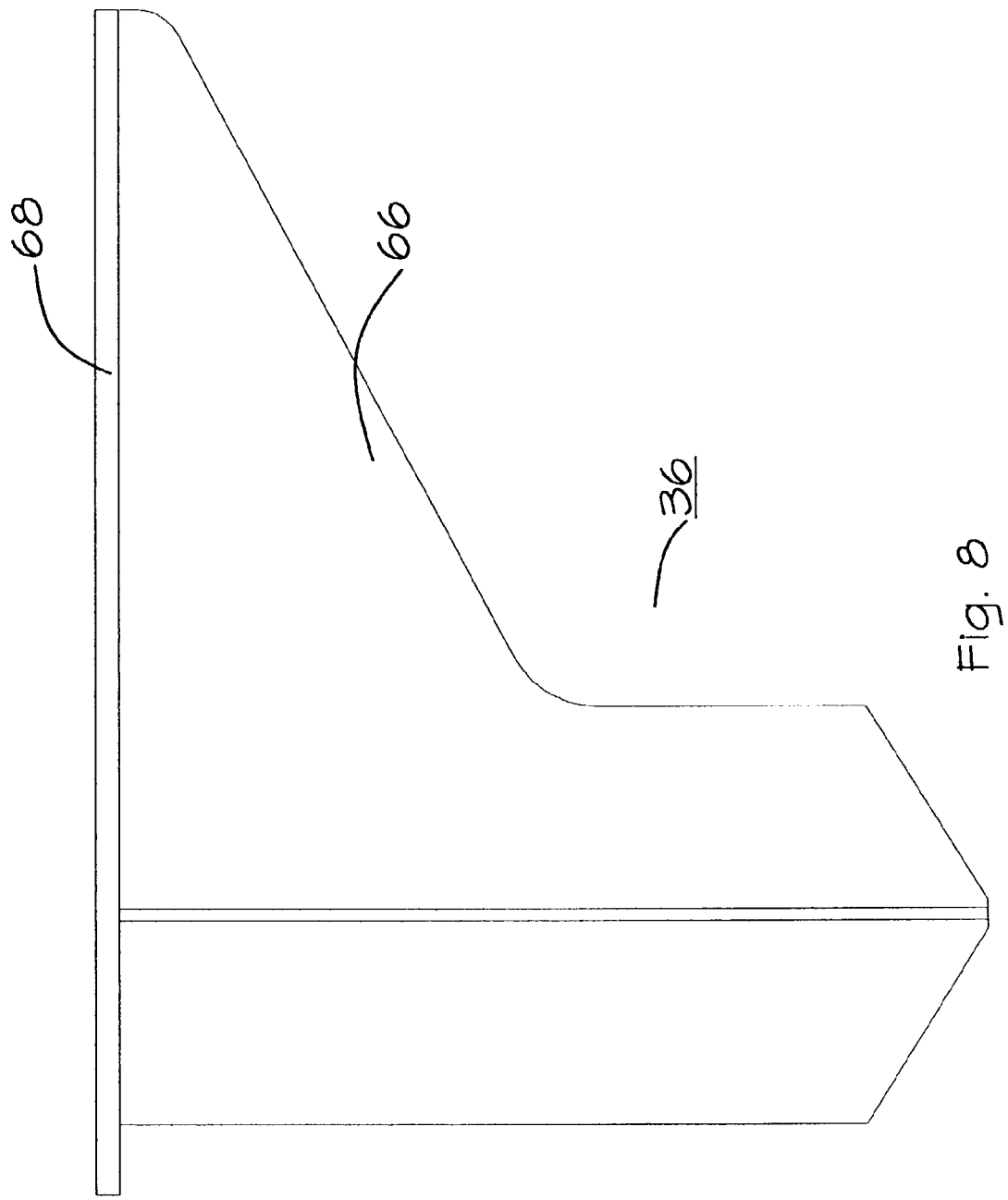
FIG. 8 is a side view of the lineal travel frame, on which the travelling saws are supported.
Figure 9:
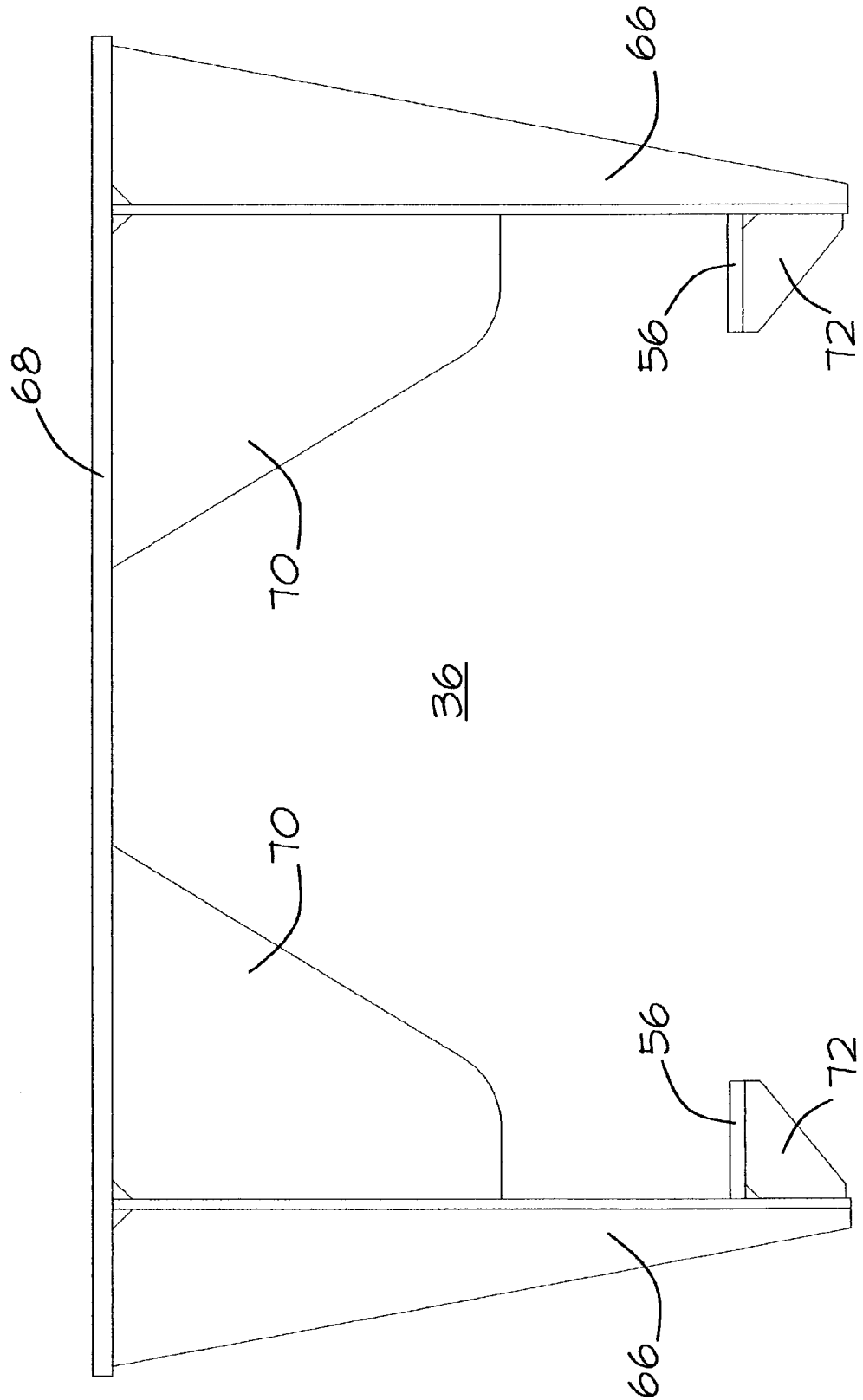
FIG. 9 is a front view of the lineal travel frame of FIG. 8.

The lineal travel frame 36 comprises a vertical pair of L-shaped plates 66, shown in FIG. 8, joined together on their long sides in spaced relation by a horizontal plate 68. The frame 36, shown from the front in FIG. 9, is thus roughly three-sided, though extra supporting brace plates 70 may be added as necessary. The short sides of the vertical plates 66 have small shelves 56, supported by gussets 72, extending into the box created by the vertical plates 66 and horizontal plate 68. These shelves 56 serve to support the spherical roller bearings 54 (not shown), which in turn supports the entire saw ladder 42 (not shown).

Once the logs are cut, the log segments are ejected onto any outfeed conveyor, which carry the log segments away for further processing.

It will be appreciated by those skilled in the art that other variations to the preferred embodiment described herein may be practiced without departing from the scope of the invention, such scope being properly defined by the following claims.

The invention claimed is:

1. A log merchandiser comprising:
   a log positioning stage to establish placement and orientation of a log and support a log in a stationary position in a cradle assembly having a longitudinal axis;
   an elongated overhead truss extending above said cradle assembly parallel to said longitudinal axis;
   a rack mounted on said truss;
   a plurality of pivoting saw assemblies, each mounted for independent, selective lateral travel along said overhead truss, each of said saw assemblies comprising a pivoting saw blade selectively extendible to said cradle assembly, wherein each saw assembly of said saw assemblies comprises a frame, a circular saw rotatably mounted on a saw arbor and pivotable relative to said frame, a motor to operate the saw, a gear system comprising a pinion to engage said rack, and a second motor to actuate said pinion so as to move the saw assembly laterally along the overhead truss;
   a lateral displacement control system to control the lateral, movement of said saw assembly;
   wherein said frame comprises two vertical L-shaped plates joined by a horizontal plate connected to the long sides of each of said L-shaped plates, support shelves extending from the short sides of each of said L-shaped plates, said support shelves being located underneath said horizontal plate, and further comprises a bearing assembly, said bearing assembly and frame adapted to support said saw assembly on said truss.

2. The log merchandiser of claim 1 wherein said rack being a spur rack, and wherein said gear system further comprises a vertically mounted reducer, said reducer being connected to said second motor and adapted to rotate said pinion, said pinion being a spur gear engageable with said spur rack.

3. The log merchandiser of claim 1, wherein said bearing assembly comprises four linear roller bearings, said roller bearings being mounted to the uppermost side of said horizontal plate, said horizontal plate having four corners, such that each corner of said plate has one roller bearing mounted thereon.

4. The log merchandiser of claim 3, wherein two linear bearing guideways are mounted on the lowermost side of the overhead truss and each linear bearing guideway interlocks with two of said linear roller bearings.

* * * * *